(12) United States Patent
Koehler et al.

(10) Patent No.: US 7,713,502 B2
(45) Date of Patent: May 11, 2010

(54) PROCESS FOR RECYCLING FUEL CELL COMPONENTS CONTAINING PRECIOUS METALS

(75) Inventors: Joachim Koehler, Gruendau/Haingruendau (DE); Ralf Zuber, Grossostheim (DE); Matthias Binder, Freigericht (DE); Volker Baenisch, Erlensee (DE); Marco Lopez, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 11/574,199

(22) PCT Filed: Aug. 31, 2005

(86) PCT No.: PCT/EP2005/009359
§ 371 (c)(1),
(2), (4) Date: Aug. 23, 2007

(87) PCT Pub. No.: WO2006/024507
PCT Pub. Date: Mar. 9, 2006

(65) Prior Publication Data
US 2008/0064771 A1 Mar. 13, 2008

(30) Foreign Application Priority Data
Aug. 31, 2004 (DE) .............. 10 2004 041 997

(51) Int. Cl.
*C22B 11/00* (2006.01)
(52) U.S. Cl. .............. 423/22; 75/392; 75/401; 75/414; 210/749; 210/761; 521/40; 521/45; 521/45.5

(58) Field of Classification Search ............ 75/393, 75/422, 428, 392, 401, 414, 421, 427, 744, 75/741; 521/46, 48.5, 140, 40, 45, 45.5; 423/109, 150.1, 27, 34, 98, 47, 22; 210/749, 210/761, 767, 768
See application file for complete search history.

(56) References Cited

U.S. PATENT DOCUMENTS 5,133,843 A    7/1992    Eisman (Continued)

FOREIGN PATENT DOCUMENTS

DE    30 49 886 A1    4/1982

(Continued)

OTHER PUBLICATIONS

Machine translation of JP 11-288732.*

(Continued)

*Primary Examiner*—Ling-Siu Choi
*Assistant Examiner*—Frances Tischler
(74) *Attorney, Agent, or Firm*—Smith Gambrell & Russell LLP

(57) ABSTRACT

The invention relates to a process for recycling fuel cell components containing fluorine-containing and precious metal-containing constituents: in this process, the fluorine-containing constituents are separated off from the precious metal-containing constituents by treatment with a medium present in the supercritical state. Preference is given to using water as supercritical medium. After the fluorine-containing constituents have been separated off, the precious metal-containing residues can be recovered in a recycling process without harmful fluorine or hydrogen fluoride emissions. The fluorine-containing constituents can likewise be recovered. The process is used in the recovery of precious metals and/or fluorine-containing constituents from membrane fuel cells, electrolysis cells, batteries, sensors and other electrochemical devices.

16 Claims, 1 Drawing Sheet

U.S. PATENT DOCUMENTS

| | | | |
|---|---|---|---|
| 5,356,538 A | 10/1994 | Wai et al. | |
| 5,386,055 A | 1/1995 | Lee et al. | |
| 6,034,170 A | 3/2000 | Tuminello et al. | |
| 2003/0185733 A1 * | 10/2003 | Collard et al. | 423/22 |

FOREIGN PATENT DOCUMENTS

| | | | |
|---|---|---|---|
| DE | 198 39 083 C2 | | 2/2001 |
| JP | 60-184647 | | 9/1985 |
| JP | 63210246 A | | 8/1988 |
| JP | 11-288732 | | 10/1999 |
| JP | 2000-063423 | | 2/2000 |
| SE | WO 03 000602 | * | 3/2003 |
| WO | WO 81/00855 | | 4/1981 |
| WO | WO 01-83834 A1 | | 11/2001 |

OTHER PUBLICATIONS

Hageluken, Christian, "Precious Metal Catalysts—Fields for Application and Recovery"; Erzmetall 49, 1996, pp. 122-133.

* cited by examiner

PROCESS FOR RECYCLING FUEL CELL COMPONENTS CONTAINING PRECIOUS METALS

CROSS-REFERENCE TO RELATED APPLICATIONS

This application claims the benefit of priority of German Patent Application No. 10 2004 041 997.3 filed Aug. 31, 2004, and International Application No. PCT/EP2005/009359 filed Aug. 31, 2005, which are relied on and incorporated herein by reference.

INTRODUCTION AND BACKGROUND

The invention relates to a process for recycling fuel cell components, in particular to obtain precious metals and/or fluorine-containing constituents from fuel cell components, for example from PEM fuel cell stacks, DMFC fuel cells, catalyst-coated membranes (CCMs), electrodes or membrane-electrode units (MEUs), in a more concentrated form. The fluorine-containing constituents are separated from the residues containing precious metals by treatment in a supercritical medium. The precious metals are recovered from the residues without harmful fluorine or hydrogen fluoride emissions in conventional processes.

The process is employed in the recovery of precious metals and/or fluorine-containing ionomer materials from fuel cells, electrolysis cells, batteries, sensors and other electrochemical devices.

The energy conversion process in a fuel cell is largely free of pollutants and has a particularly high efficiency. For this reason, fuel cells are becoming increasingly important for alternative drive concepts, domestic energy supply plants and also portable applications.

PEM fuel cells are made up of a stack of many fuel cell units. These are electrically connected in series to increase the operating voltage. The key component of a PEM fuel cell is the Membrane-Electrode Unit (MEU). The MEU comprises the proton-conducting membrane (polymer electrolyte membrane or ionomer membrane), the two gas diffusion layers (GDLs or "backings") on the sides of the membrane and the electrode layers located between membrane and gas diffusion layers. One of the electrode layers is configured as anode for the oxidation of hydrogen and the second electrode layer is configured as cathode for the reduction of oxygen.

Depending on the specification and field of use, the catalyst components in fuel cell stacks contain considerable amounts of precious metals such as platinum, ruthenium, palladium and others. For example, a 50 kW PEM stack as is currently used for mobile applications in passenger cars contains from about 50 to 100 grams of platinum (i.e. about 1-2 g of platinum/kW). The widespread introduction of fuel cell technology for automobiles involving large numbers of fuel cells would mean the provision of considerable quantities of platinum, at least for the first generation of vehicles. In addition, there then has to be a recovery process available for the precious metals bound in the fuel cell stack so that a closed loop for precious metals and thus the supply of precious metals is ensured.

Apart from the precious metal catalysts, the membrane materials have the highest material costs. The polymer electrolyte membrane comprises proton-conducting polymer materials, hereinafter also referred to as ionomers for short. Preference is given to using a tetrafluoroethylene-fluorovinyl ether copolymer bearing sulphonic groups. This material is produced in expensive and complicated processes and is marketed, for example, under the trade name Nafion® by DuPont. For use in fuel cells, these membranes generally need to have a thickness of from 20 to 200 µm, so that considerable amounts of membrane materials are present in fuel cell stacks.

The electrode layers for anode and cathode contain not only the proton-conducting fluorine-containing polymer (Nafion®) but also electrocatalysts which catalyse the respective reaction (oxidation of hydrogen or reduction of oxygen). As catalytically active components, preference is given to using the metals of the platinum group of the Periodic Table of the Elements (Pt, Pd, Ag, Au, Ru, Rh, Os, Ir). In the majority of cases, use is made of supported catalysts in which the catalytically active platinum group metals have been applied in finely divided form to the surface of a conductive support material, for example carbon black.

The gas diffusion layers (GDLs) generally comprise carbon fibre paper or woven carbon fibre fabrics which are usually hydrophobicized with fluorine-containing polymers (PTFE, polytetrafluoroethylene, etc.). They make it possible for the reaction gases to gain ready access to the reaction layers and allow the cell current and the water formed to be conducted away readily.

In the construction of fuel cell stacks, GDLs and MEUs are stacked on top of one another using bipolar plates. The sequence is generally: end plate—GDL (anode)—CCM—GDL (cathode)—bipolar plate—GDL (anode)—CCM—GDL (cathode)—bipolar plate (etc.)—end plate. Depending on the required power range, up to 100 MEUs are stacked on top of one another in a stack.

The bipolar plates generally comprise of conductive carbon, preferably graphite. They contain channels in a particular pattern through which gas supply (fuel gas to anode and air to cathode) is effected in the stack. During recovery of precious metals and membranes from the PEMFC stack, the bipolar plates can in principle be separated off during disassembly of the stack and be reused. However, processes in which the entire stack (including the bipolar plates) is passed to recovery are also possible.

Commercialization of PEM fuel cell technology requires not only industrial production processes for catalyst-coated membranes (CCMs), catalyst-coated gas diffusion layers (CCBs) and Membrane-Electrode Units (MEUs) but also industrial and rational processes for recovering the precious metals and the expensive ionomer membranes. Only the use of such processes will make fuel cell technology economically and ecologically feasible. The provision of appropriate recycling processes creates the preconditions for fuel cell assemblies being able to be introduced on the market in large numbers for mobile, stationary and portable applications.

There are only few examples of the recycling of precious metal-containing fuel cell components and the recycling of ionomer membranes in the literature.

Conventional combustion processes are known for obtaining precious metal concentrates from catalysts. Residues of catalysts having combustible carbon supports (for example Pd/activated carbon) are burnt in gas furnaces and the precious metal-containing ash is worked up. The precious metal concentration after ashing is normally sufficiently high for direct digestion using wet chemical methods (cf. C. Hagelueken, "Edelmetalleinsatz und—Recycling in der Katalysatortechnik", Erzmetall 49, No. 2, pages 122-133 (DZA Verlag für Kultur und Wissenschaft, D-04600 Altenburg).

WO 01/83834 A1 discloses a process for recovering precious metals from organic precious metal-containing materials, in which organic impurities and residues are removed by means of supercritical water and oxygen in an oxidation process.

WO 81/00855 teaches a method for treatment of organic materials in supercritical water. The feed organic materials are restructured to form resulting organic materials including non-toxic materials from toxic starting materials and useful volatile organic liquids.

U.S. Pat. No. 5,133,843 proposes a process comprising dissolution of the precious metals in aqua regia for the work-up or recovery ("rejuvenation") of an ionomer membrane coated with precious metals. The ionomer membrane can then be reused for fuel cells.

JP 11,288,732 describes a method of recovering components for fuel cells, in which the membrane-electrode units are treated with a solvent which dissolves the fluorine-containing ionomer or the membrane. The fluoropolymer is in this way separated off from metallic catalysts and other insoluble constituents. A disadvantage of the process is the use of organic solvents which present problems in respect of flammability, safety, environmental pollution and toxicity. The further work-up of the fluorine-containing catalyst components is not described.

The recovery of used perfluorinated sulphonic acid membranes is described by H-F. Xu, X. Wang et al. in Journal of Applied Electrochemistry (2002), 32 (12), pages 1337-1340. The Nafion® membrane is dissolved in DMSO at 170° C. and atmospheric pressure and is subsequently recovered in a "recast" process. Here too, the use of organic solvents is a disadvantage.

In the direct pyrolytic work-up of fluorine-containing fuel cell components and composite materials (for example PEM stacks, MEUs, GDLs and catalyst-coated ionomer membranes), hydrogen fluoride (HF) is formed from the organic polymers during combustion. This gas is present in the combustion gases, so that an additional purification device for its removal is necessary. Furthermore, owing to its toxicity and corrosive properties, hydrogen fluoride requires specific safety measures, for example pipes, filters and scrubbers made of stainless steel. For these reasons, the direct pyrolytical concentration of precious metals from fluorine-containing fuel cell components has hitherto been associated with great technical problems.

Furthermore, the fluorine constituents have to be removed from the precious metal-containing slag or mixture, since they would interfere in the later work-up process or in the separation of the precious metals and lead to a reduction in yield. For this reason too, the fluorine-containing constituents have to be separated from the precious metal-containing constituents.

SUMMARY OF THE INVENTION

It was therefore an object of the invention to provide a process for recycling fuel cells, in particular for obtaining precious metals and/or fluorine-containing compounds from fuel cell components in more concentrated form, which process overcomes the disadvantages described. The process should be simple, versatile and environmentally friendly and should cause no fluorine emissions or solvent emissions.

The invention resides in a process for recycling fuels cell components containing fluorine-containing and precious metal containing constituents, wherein the fluorine-containing constituents are separated off from the precious metal-containing constituents by treatment with a medium present in the supercritical state.

According to the invention, the fluorine-containing constituents or compounds (for example ionomers, polymers, wetting agents, surfactants, etc.) are dissolved by treatment in a supercritical medium and separated off from the components containing precious metals. The precious metals are recycled from the separated-off residue. The fluorine-containing compounds can be recovered from the solution in the supercritical medium.

BRIEF DESCRIPTION OF DRAWING

The invention will be further understood with reference to the accompanying drawing which shows a flow diagram for the process of the invention.

DETAILED DESCRIPTION OF THE INVENTION

Figure 1:
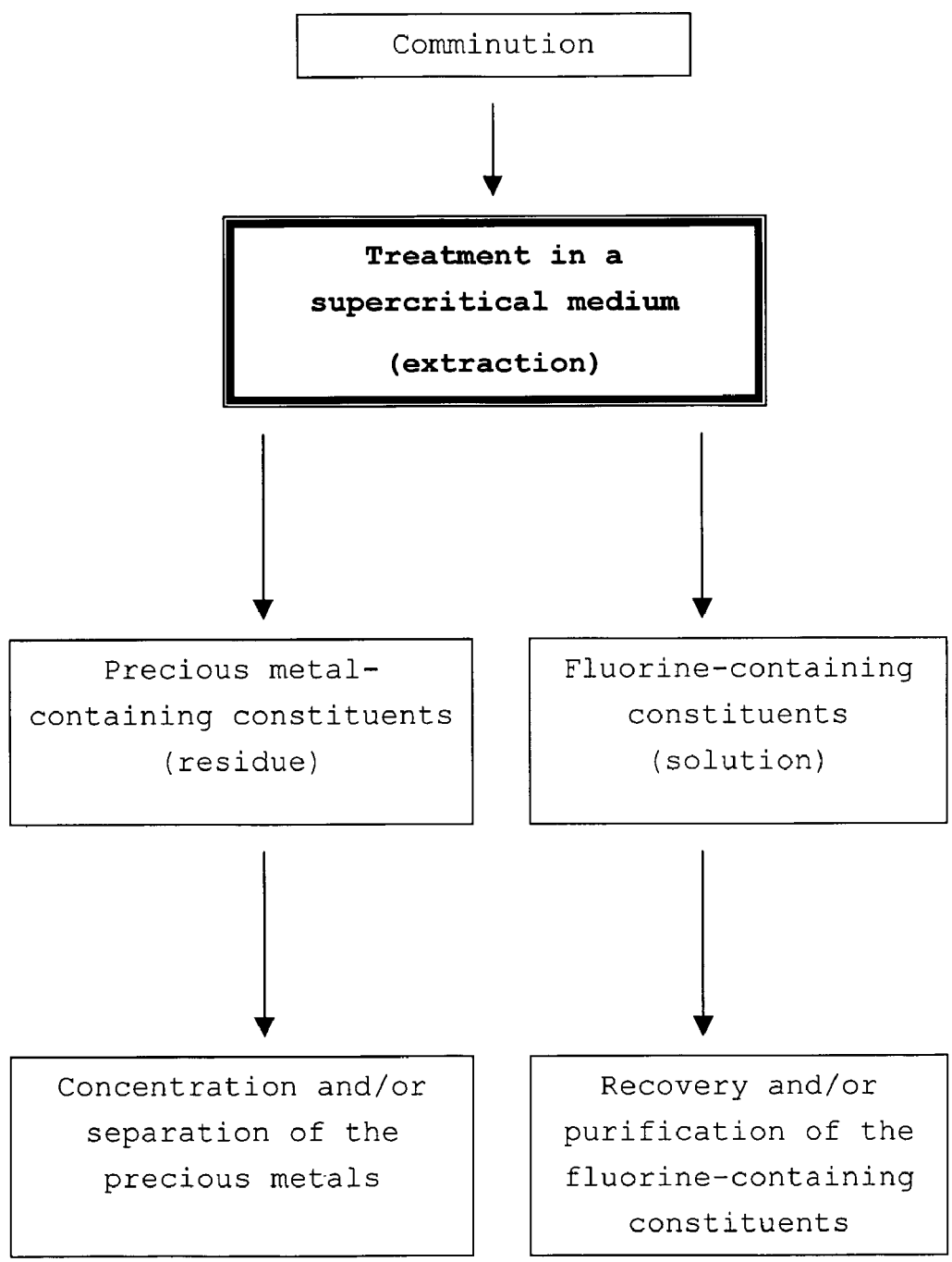

The process of the invention is based on an extraction process for separating fluorine-containing compounds from the precious metal-containing fuel cell components. The extraction process is carried out using supercritical media. In the extraction process, the fuel cell components are firstly comminuted and then treated with a medium in the supercritical state. The fluorine-containing compounds are extracted or brought into solution and separated off from the precious metal-containing residue.

The extracted fluorine-containing compounds are processed further in a suitable way, and the precious metal-containing residue can subsequently be worked up further in conventional processes. No organic solvents are used in this recycling process. Furthermore, the process causes no fluorine-containing emissions (i.e. emissions of hydrogen fluoride (HF), fluorine ($F_2$) or fluorides), so that the overall process is very environmentally friendly.

It has surprisingly been found that the fluorine-containing constituents or compounds (polymers, ionomers, surfactants, etc.) can be dissolved in supercritical media and in this way separated from the precious metal-containing fuel cell components. In a subsequent work-up of the precious metals from the fluorine-free residue, it is naturally not possible that fluorine-containing emissions are liberated, so that the use of an expensive offgas purification plant in a later heat treatment can be eliminated.

Furthermore, the absence of fluorine means that there is no interference with the separation process of the precious metals (for example the separation of Pt and Ru).

The technology of supercritical media has been comprehensively described in the literature. Substances such as water or carbon dioxide become highly effective solvents and reaction media when they are heated under pressure too far above the boiling point. At a particular point, the density of the vapour becomes virtually as high as that of a liquid. In this "supercritical state" (i.e. liquid and gaseous at the same time), completely new physical properties are displayed. Thus, above 374° C. (647° K.) and a pressure of 220.6 bar, water suddenly dissolves oils and other organic compounds. This phenomenon can be exploited in a wide variety of applications. Since 1990, supercritical carbon dioxide has been used for decaffeinating coffee and also for isolating natural flavours and active compounds for the food, cosmetics and pharmaceutical industries, and also for dyeing and cleaning.

As supercritical medium, preference is given to using water; further possible media are shown in Table 1.

TABLE 1

Supercritical media and use conditions for the extraction of fluorine-containing constituents from fuel cell components

| Medium | Temperature [° K] | Pressure [$10^5$ Pa] |
|---|---|---|
| Nitrogen ($N_2$) | >126 | >33.9 |
| Carbon dioxide ($CO_2$) | >304.2 | >73.8 |
| Water ($H_2O$) | >647.2 | >220.6 |
| Ammonia ($NH_3$) | >405.6 | >113.7 |

The process of the invention with its various steps is shown schematically in FIG. 1. In addition to the extraction process for the fluorine-containing constituents, it can additionally contain a comminution step and steps for concentration or separation of precious metals. Furthermore, the process can encompass additional steps for the recovery and/or purification of the fluorine-containing constituents (in the case of a perfluorosulphonic acid ionomer, for example a film drawing or "recast" process).

The steps for the concentration and/or separation of precious metals comprise, for example, pyrolysis processes, melting processes, metallurgical smelting processes, wet chemical processes or combinations thereof. Suitable wet chemical processes for the work-up, separation and isolation of precious metals are, for example, acid treatment, alkali treatment, oxidation or reduction processes and also precipitation processes.

If the extraction of the fluorine-containing constituents is carried out in a medium which is liquid at room temperature and at atmosphere pressure, and which is brought to supercritical conditions during the process (for example water), the fluorine-containing constituents remain in dissolved form in the selected medium and are separated off.

The precious metal-containing residue is passed to the precious metals recovery. The precious metals can be separated off from this residue in a wet chemical process, for example by leaching of the precious metals and subsequent filtration or separation. However, it can also be carried out in conventional pyrolysis or melting processes.

To carry out the extraction process for the fluorine-containing constituents or compounds batchwise, it is possible to use, for example, autoclaves which are suitable for setting the required temperatures and pressures. These autoclaves should preferably consist of materials which do not corrode under the supercritical conditions. The comminuted fuel cell components are then placed in a frit filter or a Soxhlett filter so that they are well wetted by the supercritical medium and the fluorine-containing constituents can be extracted and separated off.

For continuous operation of the process, it is possible to use flow tube reactors or other flow-through reactors.

Water has been found be particularly useful as supercritical medium. The aqueous solution obtained by the process of the invention contains the fluorine-containing constituents in dissolved form and can be processed further in low-emission processes.

The supercritical medium is generally used in amounts up to a 1000-fold excess, preferably up to a 100-fold excess (based on the mass of the fluorine-containing constituents).

When water is used as supercritical medium, the temperature range for the pressure reactor (autoclave) is from about 350 to 450° C., and the pressure is in the range from about 200 to 400 bar (i.e. 200 to $400\times10^5$ Pa). The reaction times are from about 1 hour to 10 hours. When other supercritical media are used, the reaction conditions have to be determined by means of preliminary experiments.

Examples of fluorine-containing constituents or compounds in fuel cell components are perfluorosulphonic acid polymers and fluorine-containing ionomer membranes such as Nafion®, Flemion®, Gore-Select®, Aciplex® etc. in acid or salt form, perfluorinated polymers such as PTFE®, Hostaflon® or Teflon®, dispersions used for hydrophobicizing GDLs (e.g. aqueous dispersions of Teflon® or Hostaflon®); fluorinated copolymers such as FEP (copolymer of tetrafluoroethylene and hexafluoropropylene) or PFA (polytetrafluoroethylene with perfluorinated alkoxy side chain); composite membranes containing a support fabric made of fluorinated polymers (for example Gore-Select® membranes), partially fluorinated or per-fluorinated wetting agents, additives and surfactants (e.g. Fluorad®, perfluorooctanoic acid, etc.) which are used in various preparations.

Starting materials for the recycling process of the invention are in principle all fluorine-containing and precious metal-containing components as occur in stacks of membrane fuel cells (PEMFC, DMFC). These include membranes coated with catalyst on one or both sides (CCMs), catalyst-coated gas diffusion layers (GDLs), Membrane-Electrode-Units (MEUs) with gas diffusion layers applied to both sides ("5-layer" MEUs), MEUs with or without a protective film or seal, 5-layer MEUs with integrated bipolar plates ("7-layer" or "9-layer" MEUs). In principle, PEM fuel cell stacks can also be used as starting materials in the process of the invention after appropriate comminution and/or disassembly. Furthermore, fluorine- and noble-metal containing scrap from the production of fuel cell components (for example catalyst residues, paste residues, catalyst inks and further intermediate products or rejects from the manufacture of MEUs, CCMs and GDLs) can also be used as starting materials in the recycling process. Intermediate products from the work-up of catalyst-coated membranes (CCMs) and MEUs to recover precious metals, for example separated-off catalyst layers of CCMs or detached electrode layers, can also be processed in the recycling process of the invention. Such electrode layers generally contain the ionomer material in finely divided form.

The fuel cell components to be recycled are comminuted in suitable machines and processes at the beginning of the process. Chopping methods, for example, have been found to be useful for the comminution of MEUs, and CCMs. It is also possible to use jaw crushers and/or hammer mills for comminuting MEUs with bipolar plates. Preference is given to using powdered material or pieces having an edge length of from 1 to 3 cm. The materials are placed in the pressure reactor and treated with the reaction medium.

After the extraction, the precious metal-containing residue can be separated off from the extraction solution by means of conventional apparatuses (e.g. filters, filter presses, suction filters, etc.).

The extraction solution can be used for the recovery of the fluorine-containing compounds. If the extraction solution contains only ionomer constituents (i.e. no PTFE or other F-containing constituents), this solution can be passed directly to membrane recovery. For example, it can be used to produce recycled membrane films by casting ("recast") processes.

If the extraction solution contains further fluorine compounds in addition to the ionomer, these can be separated off from the ionomer component by means of suitable purification steps before further processing.

The recovery of the precious metals from the separated-off residue can be carried out in a wet chemical process, for example by leaching of the precious metals and subsequent filtration or separation. However, it can also be carried out in a fusion process.

The following example illustrates the process of the invention.

EXAMPLE

A three-layer, catalyst-coated membrane (CCM, weight: about 10 g, containing about 1 g of catalyst coating) is comminuted mechanically into pieces having an edge length of 1-3 cm. Together with 1500 ml of deionized water, the material is then placed in a heatable stainless steel autoclave provided with a stirrer. The CCM contains a platinum catalyst supported on carbon black, perfluorinated ionomer (of Nafion®—solution DE-1020, from DuPont, USA) and a 25 µm thick per-fluorinated ionomer membrane (Nafion® NR 112, from DuPont, USA).

The setpoint temperature of the autoclave is set to 374° C. During the duration of the experiment of about 7 hours, a temperature maximum of 382° C. and a pressure maximum of 240 bar are reached.

The transparent, greenish solution with a black sediment obtained from the experiment is filtered through a commercial laboratory filter. The filter cake obtained has a consistency similar to that of carbon black, and the filtrate is clear and has a greenish colour.

The filter cake is subsequently dried at 110° C. and analysed. Apart from the precious metal Pt, only carbon-containing residues can be detected; fluorine-containing constituents are not present. The filter cake is passed to a wet chemical process for precious metal recovery, with Pt being obtained in very good yield without fluorine emissions.

The greenish solution is concentrated and can be used further for producing ionomer membranes by a casting process. However, it can also be used as ionomer solution in the production of catalyst inks.

The invention claimed is:

1. Process for recycling fuel cell components containing fluorine-containing and precious metal containing constituents, wherein the fluorine-containing constituents are separated off from the precious metal-containing constituents by treatment with a medium present in the supercritical state, and wherein the treatment is carried out using supercritical water in a temperature range from 350 to 450° C. and a pressure range from 200 to 400 bar.

2. Process according to claim 1 which further comprises steps for the comminution of the fuel cell components.

3. Process according to claim 1 which further comprises steps for the concentration and/or separation of the precious metals.

4. Process according to claim 1 which further comprises steps for the recovery and/or purification of the fluorine-containing constituents.

5. Process according to claim 3, wherein the steps for the concentration and/or separation of the precious metals comprise at least one of pyrolysis processes, melting processes, metallurgical smelting processes and wet chemical processes and/or combinations thereof.

6. Process according to claim 1, wherein the fluorine-containing constituents contain, a member selected from the group consisting of perfluorosulphonic acid polymers, fluorine-containing ionomer membranes, fluorine-containing ionomers, perfluorinated polymers, partially fluorinated polymers, fluorinated copolymers, PTFE dispersions, composite membranes with support fabrics made of fluorinated polymers, fluorinated wetting agents and fluorinated surfactants.

7. Process according to claim 1, wherein the precious metal containing constituents contain precious metals from the platinum group of the Periodic Table.

8. Process according to claim 1, wherein the reaction time is from 1 hour to 10 hours.

9. Process according to claim 1, wherein the medium present in the supercritical state is used in amounts up to a 1 000-fold excess, based on the mass of the fluorine-containing constituents.

10. Process according to claim 1, wherein the fluorine-containing constituents are extracted with water present in the supercritical state.

11. Process according to claim 1, wherein the fluorine-containing constituents are dissolved in the water present in the supercritical state.

12. Process according to claim 1, wherein the fuel cell components used are membranes coated with catalyst on one or both sides, catalyst coated gas diffusion layers, membrane-electrode units, membrane-electrode units with integrated bipolar plates, PEM fuel cell stacks, separated-off catalyst layers, paste residues, catalyst inks, catalyst residues and intermediate products and/or rejects from the manufacture of MEUs, CCMs and GDLs.

13. The process according to claim 1 further comprising recovering precious metals from fuel cell components.

14. The process according to claim 1 further comprising recovering fluorine-containing compounds from fuel cell components.

15. Process according to claim 1 wherein the precious metal is a member selected from the group consisting of platinum, ruthenium, palladium, rhodium, silver, gold, osmium, iridium and/or mixtures and alloys thereof.

16. Process according to claim 9 wherein water is used in amounts up to a 100 fold excess.

* * * * *